Oct. 20, 1942.　　E. W. CLEVELAND ET AL　　2,299,613
SHOCK ABSORBING STRUT FOR AIRPLANES
Filed Dec. 5, 1939
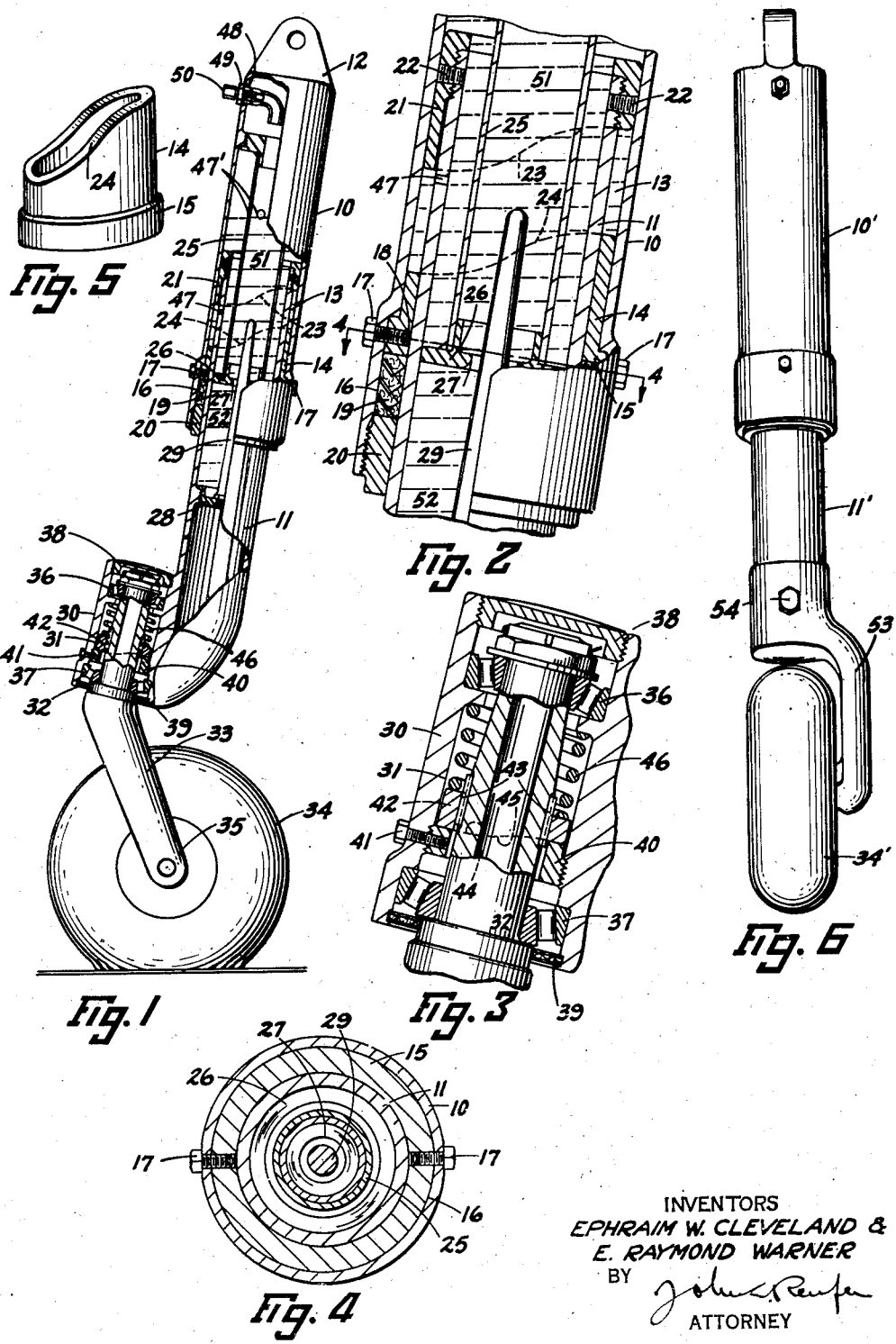
INVENTORS
EPHRAIM W. CLEVELAND &
E. RAYMOND WARNER
BY
ATTORNEY Patented Oct. 20, 1942

2,299,613

UNITED STATES PATENT OFFICE 2,299,613

SHOCK ABSORBING STRUT FOR AIRPLANES

Ephraim W. Cleveland, Berea, Ohio, and E. Raymond Warner, Burbank, Calif., assignors to The Cleveland Pneumatic Tool Company, Cleveland, Ohio, a corporation of Ohio Application December 5, 1939, Serial No. 307,648

8 Claims. (Cl. 244—104)

This invention relates broadly to airplanes, but more particularly to shock absorbing struts for the nose or tail wheels of airplanes.

One object of this invention is to produce a shock strut including two telescoping cylinders capable of relative rotation, the upper cylinder being capable of attachment to the fuselage of the airplane, while the lower one carries the nose or tail wheel of the craft, thereby enabling free castoring action of the wheel when under load, that is, during landing or taxiing of the craft; the shock strut being equipped with self-centering means so that when the airplane reaches the ground, the nose or tail wheel will automatically be positioned in a fore to aft direction preparatory to the landing of the craft.

Another object of this invention, is to produce a nose or tail wheel support including an oleo shock strut enabling free castoring action of the wheel when in contact with the ground, and equipped with means for automatically causing the wheel to assume the correct landing position when the airplane is air-borne or when the wheel is off the ground.

Another object of this invention is to produce such shock struts in a manner forming a compact assembly which is strong, durable and efficient.

In the drawing:

Fig. 1 is a side elevational view, partly in section, of a shock absorbing strut embodying the invention.

Fig. 2 is an enlarged sectional view of the central portion of the strut shown in Fig. 1.

Fig. 3 is an enlarged sectional view of the lower portion of the strut shown in Fig. 1.

Fig. 4 is a cross sectional view taken in a plane indicated by line 4—4 in Fig. 2.

Fig. 5 is a perspective view of one of the parts incorporated in the assembly.

Fig. 6 is a front elevational view of another strut also embodying the invention.

Referring to the drawing, the shock absorbing strut is shown to include two telescoping cylinders 10 and 11, the former being the outer cylinder closed at its upper end by a head 12 through which the shock absorber may be attached to the fuselage of the airplane. The inner cylinder 11 is of a diameter materially smaller than that of the outer cylinder 10, thereby forming between the two cylinders an annular chamber or compartment 13 closed at its lower end by a bushing 14 formed at its lower end with an annular flange 15 resting against the bottom of a counterbore 16 provided in the lower or inner end of the outer cylinder 10. The bushing 14 fits closely between the two cylinders to act as a sliding bearing therebetween, and in practice is preferably made of good bearing material such as bronze or the like. In the present construction, the bushing 14 is rigidly secured to the outer cylinder 10 by any suitable means such as cap screws 17 operatively carried by the cylinder 10 and projecting part way into complementary radial bores 18 provided within the annular flange 15. Below the bushing 14, there is provided in the counterbore 16 suitable packing rings 19 held in operative position by a gland nut 20, thereby assuring a fluid tight joint between the two cylinders. The upper end of the compartment 13 is closed by a sleeve-like head 21 screwed on the inner end of the inner cylinder 11 and secured thereon against accidental relative rotation by radial pipe plugs 22 screwed in the head 21 and cylinder 11. The head 21 also fits closely in the cylinder 10 to act, like the bushing 14, as a sliding bearing between the two cylinders. In the present construction, the lower end face of the head 21, hereinafter referred to as the outer end of the head, is especially machined to produce a helical cylinder cam 23 corresponding to and capable of engagement with a similar cam 24 formed on the upper end face, hereinafter referred to as the inner end, of the bushing 14, the purpose of which will be explained later.

In the construction shown, there is also included in the outer cylinder 10 a metering housing or tube 25 depending from the upper end portion of the cylinder 10 into the cylinder 11, and terminated by a partition or diaphragm 26 having a central orifice 27 extending therethrough.

Intermediate its ends, the cylinder 11 is provided with a cross wall 28 carrying a metering pin 29 extending upwardly therefrom through the orifice 27 for varying the fluid conveying capacity thereof.

In the construction shown in Fig. 1, the lower or outer end of the inner cylinder 10 is formed with an integral laterally extending boss 30 having a bore 31 extending longitudinally therethrough and substantially parallel to the common center axis of the cylinders 10 and 11. In this bore is rotatably mounted a spindle 32 formed integrally with a wheel knuckle 33 which depends from the spindle 32 in angular relation therewith. In practice the knuckle 33 is preferably made like a fork and carries a wheel 34 rotatable on a cross shaft 35 carried by the free end of the knuckle 33. The spindle 32 is preferably journaled within roller bearings 36 and 37 adequately mounted within the bore 31 of the boss 30, which bore is closed at the upper end by a cover 38 and at its lower end by a washer 39. In the present construction, there is also screwed in the bore 31 above the roller bearing 37 a ring 40 held therein by at least one cup screw 41. Above the ring 40, there is a similar ring 42 which is locked to the spindle 32 against rotation relative thereto by two keys 43 enabling limited axle movement of the ring 42 relative to the spindle 32. The abutting end faces of the rings 40 and 42 are shaped to form helical cams 44 and 45 respectively, which cams are constantly urged toward each other by a compression spring 46 acting on the ring 42.

Extending through the wall of the cylinder 11 near the head 21, there is one or more ports 47 affording communication between the cylinder 10 and the compartment 13, while the tube 25 near the upper end thereof is provided with similar ports 47'. Near its outer end, the cylinder 10 is provided with a radially extending threaded bore 48 adapted to receive a filler plug 49 and air valve 50. The interior of the tube 25 together with the interior of the cylinder 10 above the head 21, forms a chamber 51, and the interior of the cylinder 11 a chamber 52, which chambers 51 and 52 are separated by the partition 26.

In the construction shown in Fig. 6, the cylinder 11' instead of being formed with the boss 30 housing the spindle 32 as shown in Fig. 1, has its outer end carrying an offset wheel knuckle 53 rigidly secured thereon by a cross bolt 54. The knuckle 53 operatively carries a wheel 34' corresponding to the wheel 34 in Fig. 1. Internally, the construction is the exact replica of that shown in Figs. 1 and 2, the outer cylinder 10' being interchangeable with the corresponding cylinder 10.

Before installation, the shock absorber is first fully extended and while in that position liquid such as oil is poured into the cylinders through the bore 48 by removing the plug 49. When the level of the liquid finally reaches the bore 48, the shock absorber is slowly compressed into complete contracted position, thereby causing the oil to entirely fill the compartment 13 through the port 47, while the excessive amount of liquid will escape through the bore 48. Thereafter the plug 49 is again screwed into position and compressed air admitted into the cylinder 25 through the air valve 50, causing a partial extension of the shock absorber while under static load.

In the operation, during landing and taxiing operations resulting in the compression of the shock absorber, the liquid from the chamber 52 will flow through the orifice 27 into the chamber 51, and therefrom into the compartment 13 through the port 47. In this instance, the metering pin 29 slidable through the orifice 27 will gradually reduce the fluid conveying capacity of the orifice and gradually check the compression of the strut, thereby resulting in a resistance to the compression of the strut additional to that resulting from the compressed air stored within the upper end of the chamber 51.

The extension of the strut resulting from the subsequent recoil movement of the airplane relative to the wheel 34, will be checked by the displacement of the liquid from the compartment 13 through the rather small port 47, and from the cylinder 10 into the tube 25 through the ports 47', thereby producing an efficient means for cushioning the landing and taxiing shocks of the airplane. The shock absorbing functions of the strut being well known in the art, further explanation of the same is not thought necessary.

Referring now more particularly to the invention, when the landing wheel 34 is in contact with the ground and the shock absorber is in a more or less compressed condition, the head 21 of the cylinder 11 is spaced axially from the bushing 14, thereby enabling free relative rotation of the two cylinders 10 and 11, and the consequential castoring action of the wheel 34 about the center axis of the shock absorber. In the construction shown in Fig. 1, the spindle 32 being relatively free to rotate within the bore 31 of the boss 30 will cooperate with the relative rotation of the two cylinders to prevent lateral rapid oscillation or shimmy of the wheel, a feature forming the basis of our co-pending application, Serial No. 199,284. As the spindle 32 rotates within the bore 31, the ring 42, due to the engagement of its cam 45 with the similar cam 44 of the ring 40, will move axially relative to the spindle 32 by compressing the spring 46.

When the craft leaves the ground or is airborne, the weight of the wheel together with the action of the compressed air within the upper end of the chamber 51 will cause the complete extension of the strut, which extension is ultimately limited by the head 21 resting on the bushing 14. Toward the end of the extension stroke of the strut, the cam 23 will engage the cam 24 and cause axial rotation of the cylinder 11 resulting in the boss 30 to be positioned as shown in Fig. 1, that is, in adequate position to enable trailing condition of the wheel 34 relative to the spindle 32 within a vertical plane parallel to the vertical planes within which are located the main landing wheels of the airplane. In this instance, while the cylinder 11 is rotated into the proper position relative to the cylinder 10, the compression spring 46 active on the ring 42 will, due to the interengagement of the cams 44 and 45, effect the rotation of the spindle 32 resulting in the location of the wheels 34 within the vertical plane above referred to, or in other words, resulting in the rotation of the wheel 34 into a fore to aft or landing position.

In the construction shown in Fig. 6, upon engagement of the cams 23 and 24, the inner cylinder 11' will be rotated into a predetermined position relative to the cylinder 10', which position is calculated to result in the wheel 34' assuming a fore to aft alignment or landing position.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

We claim:

1. In a shock absorbing strut, a pair of diametrically spaced telescoping cylinders capable of relative rotation, sliding bearings between said cylinders fixed to the inner end portions thereof for maintaining them in coaxial alignment, and cam means on said bearings capable of interengagement near the end of the extension stroke of the strut for relatively rotating said cylinders to a specific alignment about a common axis and immediately thereafter for limiting said extension stroke.

2. A shock absorbing strut for aircraft comprising a pair of telescoping cylinders capable of relative rotation, a sliding bearing fixed to the inner end of each cylinder, and a helical cam on each of said bearings adapted to engage each other at a point near the end of the extension stroke of said cylinders to rotate said cylinders to a predetermined aligned position as the extension stroke continues.

3. A shock absorbing strut for aircraft comprising a pair of telescoping cylinders capable of relative rotation, a pair of sliding bearings between said cylinders one fixed to the outer and the other to the inner cylinder, and a helical cam on each of said bearings adapted to engage each other at a point near the end of the extension stroke of said cylinders to rotate one of said cylinders relative to the other into a predetermined aligned position as the extension stroke continues.

4. A shock absorbing strut for aircraft comprising a pair of telescoping cylinders capable of relative rotation, a pair of bushings between said cylinders one carried by the outer and the other by the inner cylinder, radially extending locking means through each bushing and its carrying cylinder preventing relative rotation therebetween, and cam means on each bushing adapted to engage each other at a point near the end of the extension stroke of said cylinders to rotatably align said cylinders into a predetermined position as the extension stroke continues.

5. A landing gear for aircraft comprising, the combination of a cylinder, a piston slidably and rotatably mounted within the cylinder, a wheel supported on the lower extremity of said piston, a cam follower rigidly mounted on the upper extremity of said piston, said cam follower being provided with a downwardly depending portion having a curved surface, a cam within the cylinder, said cam being rigidly attached to the cylinder at a point below the cam follower and being provided with an upstanding member having a surface which is curved in a manner similar to that of the cam follower, and means to force the piston downward in the cylinder so that the two surfaces will engage each other, thereby causing a partial rotation of the piston and the wheel to which it is attached.

6. A shock absorbing strut for aircraft comprising a pair of telscoping cylinders capable of relative rotation, a pair of sliding bearings between said cylinders one fixed to the outer and the other to the inner cylinder, and a cam on each of said bearings adapted to engage each other at a point near the end of the extension stroke of said cylinders to rotate one of said cylinders relative to the other into a predetermined aligned position as the extension stroke continues.

7. A landing gear for aircraft comprising, the combination of a cylinder, a piston slidably and rotatably mounted within the cylinder, a wheel mounted on the lower extremity of said piston, a cam follower provided with a curved surface rigidly mounted on the upper extremity of said piston, a cam having a similarly constructed surface rigidly attached to said cylinder at a point below the cam follower, and means to force the piston downward in the cylinder so that the two above mentioned surfaces will engage each other, thereby causing a partial rotation of the piston and the wheel to which it is attached.

8. A shock absorbing strut for aircraft comprising a pair of telescoping cylinders capable of relative rotation, a pair of relatively short tubular members between said cylinders one fixed to the outer and the other to the inner cylinder, and a cam on each of said members adapted to engage each other at a point near the end of the extension stroke of said cylinders to rotate one of said cylinders relative to the other into a predetermined aligned position as the extension stroke continues.

EPHRAIM W. CLEVELAND.
E. RAYMOND WARNER.